United States Patent [19]

Chou et al.

[11] Patent Number: 4,562,306
[45] Date of Patent: Dec. 31, 1985

[54] METHOD AND APPARATUS FOR PROTECTING COMPUTER SOFTWARE UTILIZING AN ACTIVE CODED HARDWARE DEVICE

[76] Inventors: Wayne W. Chou, 19 Sea Beach Dr., Stamford, Conn. 06902; Richard E. Erett, 78 White Birch La., Stamford, Conn. 06905

[21] Appl. No.: 531,956

[22] Filed: Sep. 14, 1983

[51] Int. Cl.⁴ .............................................. G06F 11/00
[52] U.S. Cl. ................................ 178/22.08; 364/300; 377/28; 377/38; 340/825.34
[58] Field of Search ................. 377/38, 28; 340/825.31, 340/825.34; 364/900, 300, 200; 178/22.08

[56] References Cited

U.S. PATENT DOCUMENTS

| | | | |
|---|---|---|---|
| 3,609,697 | 9/1971 | Blevins et al. | 364/200 |
| 3,806,882 | 4/1974 | Clarke | 340/825.31 |
| 3,984,637 | 10/1976 | Caudill et al. | 340/825.31 |
| 4,271,512 | 6/1981 | Lyhus | 377/38 |
| 4,446,519 | 5/1984 | Thomas | 364/300 |
| 4,458,315 | 7/1984 | Uchenick | 364/200 |

Primary Examiner—John S. Heyman
Attorney, Agent, or Firm—Parmelee, Bollinger & Bramblett

[57] ABSTRACT

A method and apparatus are provided for protecting computer software using an active coded hardware apparatus which is adapted to be connected by an interface connector to a communications port of a computer. The computer is directed by a coded software program in which a small section of the code of the computer software interrogates the communications port periodically to determine if the active coded hardware device is present and connected. The active coded hardware device has a permanently established preset code on an active presettable counter circuit which code is transmitted when interrogated. If the active coded hardware device is present when interrogated and the correct code returned through the communications port of the computer, the program is permitted to continue insuring that the software is properly protected at all times. The active coded hardware device with its particular code and circuitry are sealed in epoxy as a deterrent against tampering. In order to violate the hardware it would be necessary to construct a duplicate of the hardware device in order to run a second copy of the software. Since the device is active containing electrical logical elements the degree in duplicating the device and its function without the benefit of circuit diagrams will be greater than the software itself. The particular hardware may be used alone or will permit daisy-chaining allowing 2, 3 or even an entire family of other elements with their own individual codes to operate simultaneously and at the same time permit computer peripherals to remain connected to the same port. A variety of time and logic elements may be added to the basic configuration in order to increase the difficulty of duplicating or violating the system.

11 Claims, 6 Drawing Figures

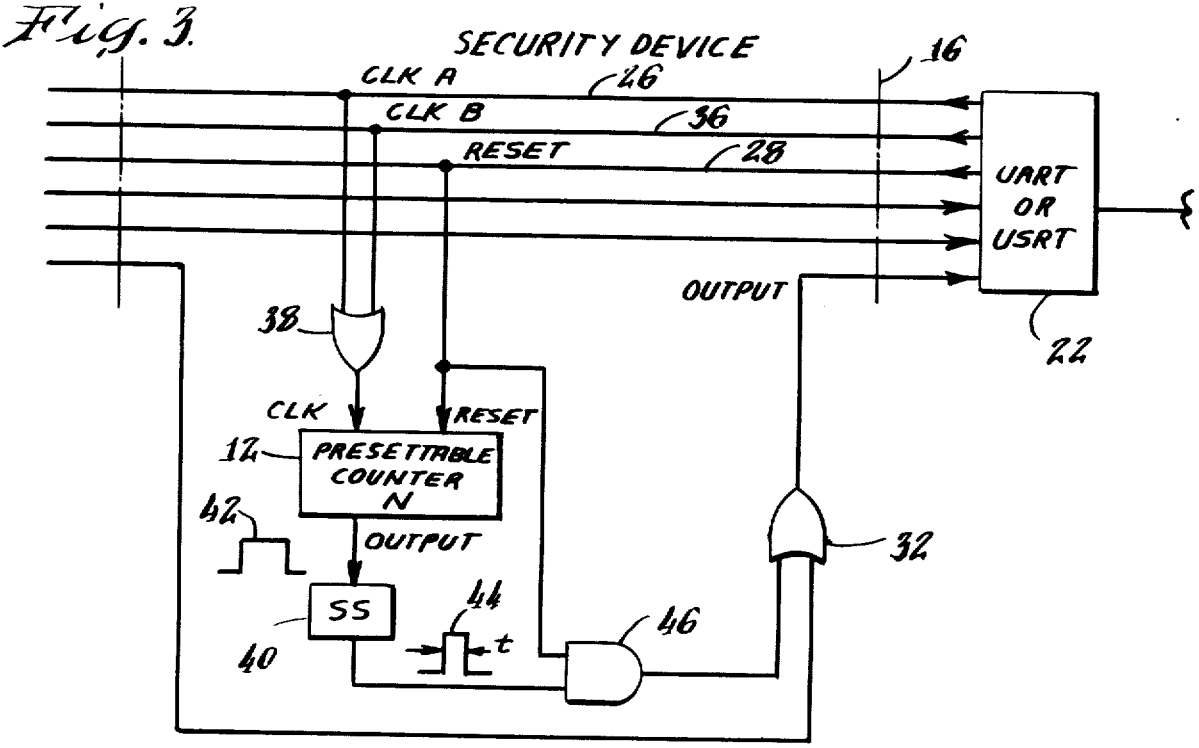

METHOD AND APPARATUS FOR PROTECTING COMPUTER SOFTWARE UTILIZING AN ACTIVE CODED HARDWARE DEVICE

BACKGROUND OF THE INVENTION

This invention relates to a security system for the protection of computer programs and more particularly to such a system which uses a plug-in action coded hardware device which is furnished with the program to be protected and is interrogated by the program.

Many micro-computer products are based on one of a relatively small group of microprocessors making it technically as well as economically feasible to copy computer programs, and to move them from one hardware environment to another. Much of the computer software or programs are written and distributed in a form easily duplicated, for example, floppy disks or diskettes. By agreement, when the programs are sold, copies may be made for back-up purposes but not for redistribution. However, when such products become popular, unauthorized use and copying become a problem.

Many attempts have been made to thwart unauthorized use of any copies of the software programs. One such approach is to design the recording medium such that it will erase or become useless when an attempt is made to copy it, or the recording medium is designed to have physical or timing anomalies in specific locations such that an attempt to copy it will normally not produce usable results. In either of the aforesaid cases, legitimate back-up copies cannot be produced which could result in a permanent loss of important data in the event of a system failure, or at least would be a considerable inconvenience for the user.

Another approach is to supply the computer with the means to add a programmable read-only memory (PROM) into which a serial number is embedded. The software is then written to interrogate the PROM and if the serial number matches that which is written into the software, then the program is allowed to run. The disadvantage to this approach is that each piece of software must be individually serialized to each PROM and accordingly to each computer which makes the process awkward and cumbersome. Furthermore, the computer industry would have to universally agree on this approach to adapt PROMs for this purpose in order for it to succeed. Furthermore, the PROMs or modules are devices which can easily be removed and decoded and duplicated without difficulty.

Another method to protect software that is commonly used is within the software itself in which the author prepares the program to contain a control file. The control file is generally customized for a particular end user and usually contains perameters which refer to the specifics such as computer type, company name, etc. Since the source code for this file is generally not given, it would take an expert programmer to determine how to alter the file for use with other computers and for other companies. Although such an idea serves to limit unauthorized distribution, by way of difficulty in finding a programmer capable of the task, the system is not fool proof, and it is likely that there will be several computers of the same type at several other locations with the company name remaining the same. In such a case, there would be absolutely no protection against illegitimate copies. Secondly, once a particular control file has been formulated, the software will be able to be executed on any machine with a compatable operating system. Accordingly, the ohly remaining deterrent would be some other aspect of the customized version, for example, the original company name to appear on an invoice on a stolen copy. In relative terms the degree of difficulty to alter these variables is minor, the result being that this method of protection cannot be totally relied upon.

Still another method to protect software to which the present invention is directed is some type of hardware device which is supplied with each package of software sold to the user which is intended to be plugged in to a communications port in the computer in which the package is to be employed. A communications port (such as an RS-232C or similar) of a computer is an external connection between the computer and various peripheral equipments such as printers, modems, interactive game controls, etc. The port is interrogated via the software supplied to determine the presence of the hardware which if present permits the software program to proceed. If not, several options are available to the author, the simplest of which might be a display on the terminal which states that the program cannot proceed without the device being connected. Such hardware attachment devices in the past have been passive networks and/or jumpered connections which a semi-skilled technician would have little difficulty in duplicating. More sophisticated devices have revolved around the implementation of a PROM in a manner cited above, but the execution of the decoding process with its attendent circuitry outside the computer body poses problems and complexity, and excess hardware such as providing timing, register storage, addressing means and external power requirements not normally in a communications port make such a system fairly costly and impractical.

SUMMARY

Accordingly, it is an object of the present invention to provide a new and improved method and apparatus for protecting computer software which uses an active coded hardware device which is connected to a communications port of a computer and used in conjunction with a small section of code embedded in various areas of the author's program in order to prevent unauthorized duplication and use of the particular program protected by the active coded hardware device.

A further object of this invention is to provide an external plug-in device for protecting computer software which requires no additional hardware or logic and quickly responds to the code in the software when interrogated.

Still another object of this invention is to provide a new and improved method and apparatus for protecting computer software which is extremely flexible and permits a variety of incription and interrogation sequences making it more difficult to find and decipher the code involved and thereby copy the software.

Another object of the invention is to provide a new and improved method and apparatus for protecting computer software which represents a level of sophistication many orders of magnitude greater than other protection devices available in the past which is limited only by the ingenuity of the software engineer.

Still another object of this invention is to provide a new and improved method and apparatus for protecting computer software which permits legitimate back-up copies to be made and the program transferred to a hard recording disk and other operations performed normally without any additional effort on the part of the user.

Still a further object of this invention is to provide a new and improved method and apparatus for protecting computer software which is active thereby containing logical elements consisting of circuitry in which the degree of difficulty in duplicating the circuitry and/or its function would cost many times the price of the development of the software itself.

Still a further object of this invention is to provide a new and improved method and apparatus which will allow 2, 3 or even more or an entire family of software to operate simultaneously in the same computer port.

Still another object of this invention is to provide an apparatus for protecting computer software which has great flexibility in changing or varying the incription, timing and interrogating functions utilizing various combinations of time and logic making duplication expensive, time consuming and frustrating.

In carrying out this invention in one illustrative embodiment thereof, a method and apparatus of protecting computer software are provided using an active coded hardware device in conjunction with a small section of code in the computer program comprising the steps of permanently establishing a preset code on an active presettable counter circuit which preset code is transmitted and interrogated. The presettable counter is connected into a communications port of the computer by an interface connector and then the computer program is executed by the computer. This step interrogates the communications port periodically using the small section of code in the computer program to determine if the active presettable counter is present, which if present and the correct code is returned from the counter at the time of the interrogation, the program is permitted to continue.

Preferrably, the code and circuitry of the active coded hardware device are sealed in epoxy as a deterrent against tampering. Duplicating such hardware would be difficult without the benefit of the circuit diagrams for such an active preset device. The system also may be made available in customized configurations with individual codes assigned to each protected software product. The active coded hardware device may be interfaced with a computer by itself or in a multiple connector version to permit daisy-chaining thereby allowing 2, 3 or even an entire family of software each with its own individual code to operate simultaneously. Daisy-chain versions would allow peripherals to remain connected to the same port.

BRIEF DESCRIPTION OF THE DRAWINGS

The invention, together with further objects, features, advantages and aspects thereof will be more fully understood from the following description taken in conjunction with the accompanying drawings in which like elements bear the same reference characters throughout the several drawings.

FIG. 3 illustrates an additional embodiment of the present invention implementing the use of time in conjunction with logic.

FIG. 4 shows still a further modification of the embodiment of FIG. 3 of the security system.

DESCRIPTION OF THE PREFERRED EMBODIMENTS

In the following description and circuit diagrams positive logic is assumed for purposes of explanation and simplicity. However, positive logic is not essential to the present invention. Furthermore, the block diagrams illustrate the principles involved and should not be considered as limiting, since portions may be omitted or added to create other variations which fall within the scope of the present invention.

Figure 1:
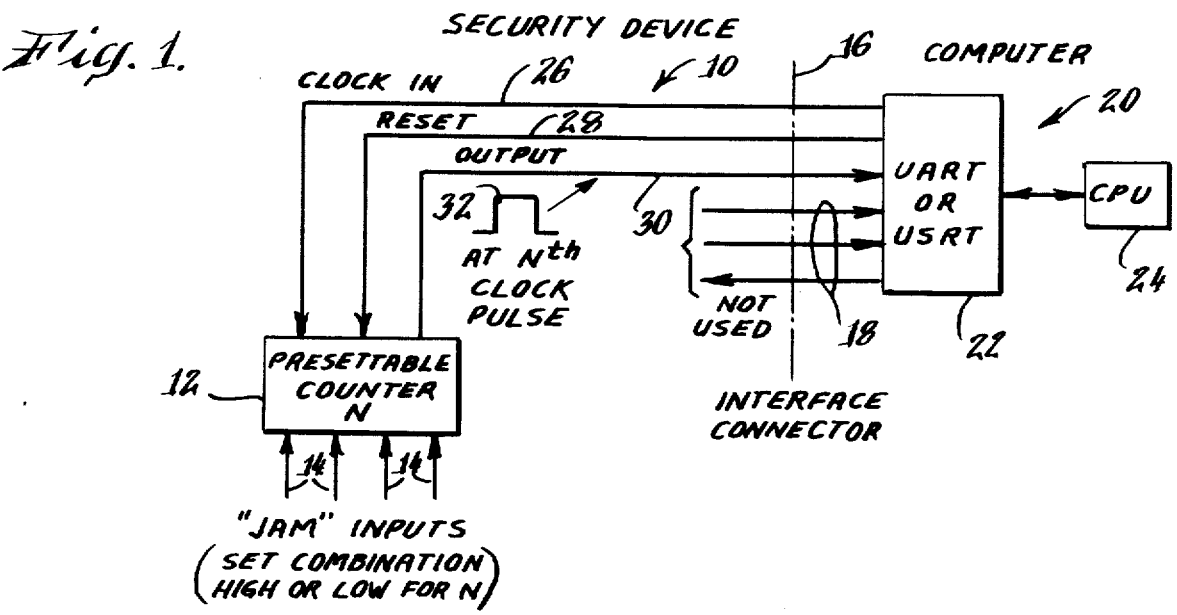
FIG. 1 illustrates the basic diagram of the security system for computer software embodying the present invention.

Referring now to FIG. 1, a security device, referred to generally with the reference character 10, includes a presettable counter 12 whose output value is controlled by jam inputs 14 which establish a numeric value by selecting high or low values in combination at the jam inputs 14. Once the code and circuitry of the preset counter are set and determined by hard wiring, the counter along with its code and circuitry are sealed in epoxy which preserve the functionality of the counter 12 as well as being a deterrent against tampering. To duplicate the software involved, it would be necessary to construct a duplicate counter 12 with its preset code to run a second copy of the software which is to be protected. The security device 10 is plugged in via an interface connector 16, represented by the dashed line 16 in FIG. 1, to communications port 18 illustrated as a plurality of lines 18 to a computer, referred to generally with the reference character 20. The computer 20 contains a form of UART, USRT, or USART (universal synchronous/asynchronous receiver/transmitter, etc.), or any parallel connection 22 which allows the central processing unit(CPU) 24 to communicate with external peripheral equipment, for example, the security device 10 through the interface connector 16. The interface connector is simply a standard computer plug containing a plurality of male (female) prongs which connect the lines 18 in the plurality of complementary cooperating female (male) receiving sockets of the UART 22. The UART or any of the aforementioned units 22, whichever is employed, is under the control of the CPU (central processing unit) 24. The unit 22 has several lines 18 emanating therefrom some of which are transmitting and others of which are receiving lines which permit the CPU 24 through software to transmit and/or receive through the various lines 18 available via its UART 22 digital information at various times as determined by the program. These lines include a clock input 26, a reset line 28, and an output line 30 all of which are coupled by the interface 16 to the UART 22 and the presettable counter 12.

Accordingly, the clock in line 26 may be utilized to increment or decrement the presettable counter 12 and at the Nth clock transition, the output 32 from the counter 12 appears at the input of the UART 22. Thus, the CPU 24 may be programmed to test if a true condition existed after N clock transitions, and if the tests were given before or after the N clock transitions, the conditions would be false, and the program could be written to void itself. Similarly, the interrogating of security device 10 if not connected during the test period would result in a false condition, even if a test is made exactly after N clock transitions. Thus, only a device with the proper code connected to the computer interface 16 would be able to return a true condition when tested after N clock transitions. In addition, the reset line 28 is available to further confuse a would-be copier. By utilizing the reset line along with the clock line alternately or on a more or less random basis, it would be more difficult to determine the function of the lines as well as the numeric value of the count especially without the benefit of schematic diagrams. As previously pointed out, the use or the testing over the reset line 28 along with the clock line 26 is under control of the CPU 24 and the computer software applied to that unit.

As described in the basic block diagram of FIG. 1 the security device 10 is an active coded hardware device which must be plugged into the computer 20 and which transmits its own code in accordance with the interrogation from the CPU 24 of the computer. It will be apparent that the more sophisticated that the security device 10 becomes, the more difficult it will be to determine not only the function of each of its lines, but also the function of the device as a whole merely by attempting to measure the electrical perimeters on its external connections. There are no instruments that can characterize a complex active circuit solely through the measurement of its unknown terminals without the benefit of schematic diagrams. By hard wiring the presettable counter 12 and embedding or encapsulating the device 12 in a suitable medium such as epoxy, the device 10 may actually be destroyed in trying to determine its characteristics.

Figure 2:
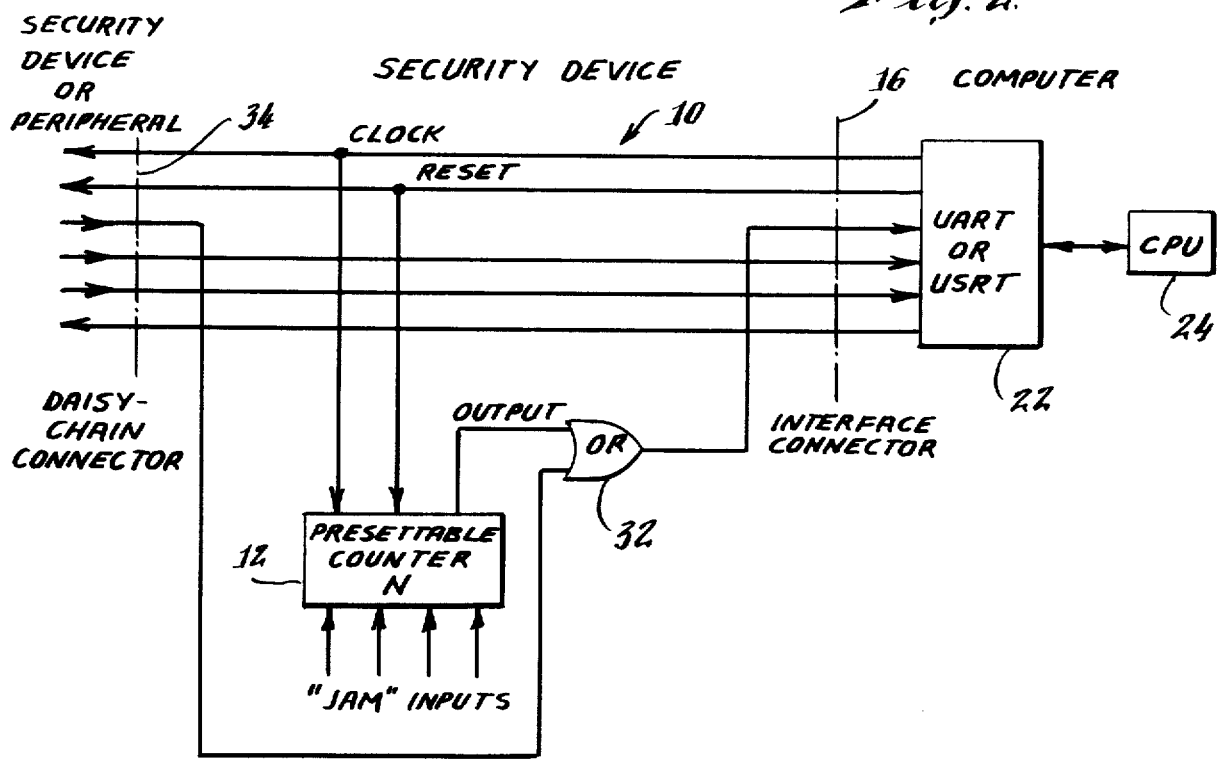
FIG. 2 illustrates another embodiment of the security system shown in FIG. 1 illustrating a daisy-chain connection utilizing a single communications port.

FIG. 2 illustrates a modification of the security device 10 in FIG. 1 which illustrates how additional security or peripheral devices may be serially interconnected to the same communications, port, which is referred to as "daisy-chaining". This is accomplished in FIG. 2 by the use of a logical OR circuit 32. An additional mating connector 34 (illustrated diagramatically by dashed line 34) may be provided so that either another security device or some other piece of peripheral equipment may be added which would normally have been connected to the same or into the same communications port. In this configuration, all of the lines are carried from one connector to the other much like an extension cord with the exception that of output lines which has been ORed by OR circuit 32. Input signals to the counter 12 are merely tapped off as required. In operation with either another or several security devices, the UART 22 receives signals from the combined security devices. Individual devices are assigned different numerical codes, and the condition at the appropriate terminal of the UART 22 is tested for a true condition after $N_x$ clock cycles, then the program which is assigned the value of $N_x$ will be allowed to run. In the case where a peripheral is connected, the security device 10 remains transparent, since all lines which were normally available to it are still available and uninterrupted by the presence of a peripheral or additional peripheral devices.

Accordingly, the present security device 10 may interface with the communications port of the computer 10 either as a stand alone item or in a multiple connector version to permit daisy-chaining thereby allowing 2, 3 or even an entire family of software each with its own individual code to operate simultaneously. Furthermore, the daisy-chain embodiment will allow the peripherals to remain connected to the same port of the computer.

FIG. 3 shows another embodiment illustrating the implementation of the two additional variations. First, if a third line 36 is available as an input, it could be used to further conceal the purpose of the first two lines. Thus, the input to counter 12 could be clocked by either a clock A or a clock B input through an input OR circuit 38 to the counter 12. Instead of the clocking of the input, it would be just as feasible to OR two lines to the reset instead (not illustrated).

A second and more important variation is the use of time as a variable in conjunction with logic. A one shot circuit (SS) 40 is connected to the output of the counter 12 such that when the output of the counter 12 is true or high, the output 44 of the one shot goes high. However, the counter 12 may remain high statistically, the duration of the output 44 of the SS 40 is only t by design which is just long enough that the reset 28 appears immediately after the counter goes high and when in the time frame t a true output would not appear at the output of an AND gate 46.

It should be noted that two things are taking place simultaneously. The SS 40 allows a short glimpse of the output with a maximum time t and the use of AND 46 prevents the output 44 from appearing just after the N clock transitions. In order to detect the output it is necessary to provide a reset almost immediately after the Nth clock and within the time "t". In so doing static testing of the security device 10 to determine its code would be virtually impossible.

FIG. 4 illustrates another embodiment utilizing a second single or one shot circuit 48 and also illustrates the use of a third one shot circuit 50. In operation, as in the example illustrated in FIG. 3, one shot 40 is triggered on the rise of the output at the resettable counter 12 and its output duration is time t1. At the end of the time period t1 a positive transition appears at the input of SS 48 through the inversion of an inverting amplifier 47 which causes a second time period t2 to occur. Accordingly, a sample or equivalent reset signal to the third one shot 50 with a time period t3 must be coincident with the output of one shot 48 at the input of the AND gate 46 to have an output occur at OR gate 36. The circuit just described will be better understood from the timing diagrams accompanying FIG. 4. The circuit requires that a sample reset level occur within the time period t2. If that time period is too early, the time period t3 may elapse before t2 begins. Conversely, if the sample occurs after the duration of t2, coincidence at the AND gate 46 will not occur.

As a variation over the operation of FIG. 3, instead of using two clock inputs which are ORed, an up-down counter could be utilized with two lines controlling the up and down counts, respectively, as illustrated in FIG. 4. FIG. 4 also illustrates how the state of the counter 12 may be altered if the sampling does not occur when the counter 12 has reached the Nth count. The output of counter 12 may be inverted by an amplifier 15 and fed into an input at the AND gate 52, and accordingly before or after the Nth count the output of the counter is low. Consequently, the output of the inverter 15 is high and any attempt to sample the device at any counter state other than at the Nth count will cause the counter to reset to zero, foiling any attempt to discover the code in the counter 12.

Figure 5:
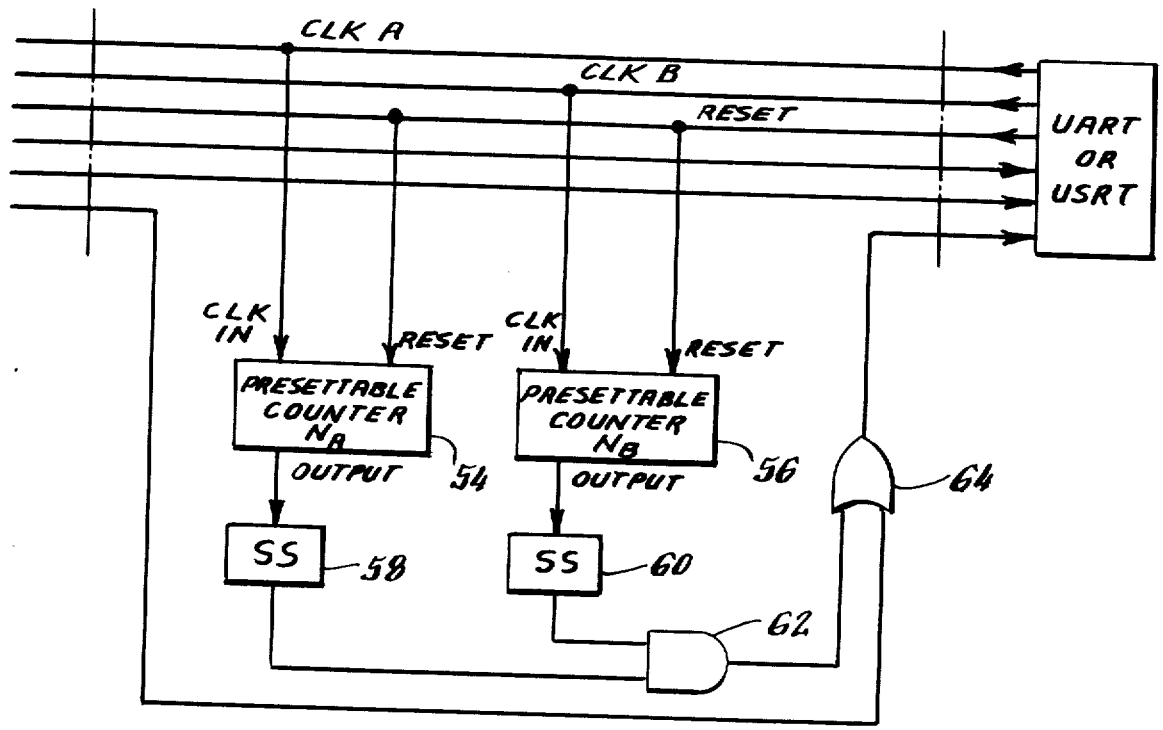
FIG. 5 illustrates a block diagram utilizing two presettable counters in the security system of the present invention.

FIG. 5 illustrates the use of two counters 54 and 56 in conjunction with two clock lines each controlling a counter independently. The output of each counter 54 and 56 is fed into their respective one shot circuits 58 and 60, and the outputs of both one shots are fed into the inputs of an AND gate 62. A true condition exists at the output of an OR gate 64 which occurs only when the outputs of the one shots 58 and 60 are high and coincident. Accordingly, by design both counters 54 and 56 must finish their respective counts simultaneously if they are clocked in in serial fashion one before the other. The time value of each one shot could be programmed such that one would be longer than the other. If the values are chosen correctly one time will eclipse the other but not visa versa which would require that the counters finish their respective counts in a given sequence and not in the reverse of such sequence.

The merits of the approach in FIG. 5 are that it is not possible to step one counter and then the other through its sequence, step the first again and repeat the second to obtain the true output. The time requirement precludes any static test. Although the total number of combinations is the product of the maximum presettable counts in each counter as it would be if the same two counters had been cascaded together instead, the degree of difficulty in determining the code given in FIG. 5 is far greater. Not only are two numerical values required, but a true output is additionally time dependent on the occurrence of the individual counter outputs. The ability to alter the time value of the one shots relative to each other adds to the requirement that the counters come to their respective values in a particular predetermined sequence.

Figure 6:
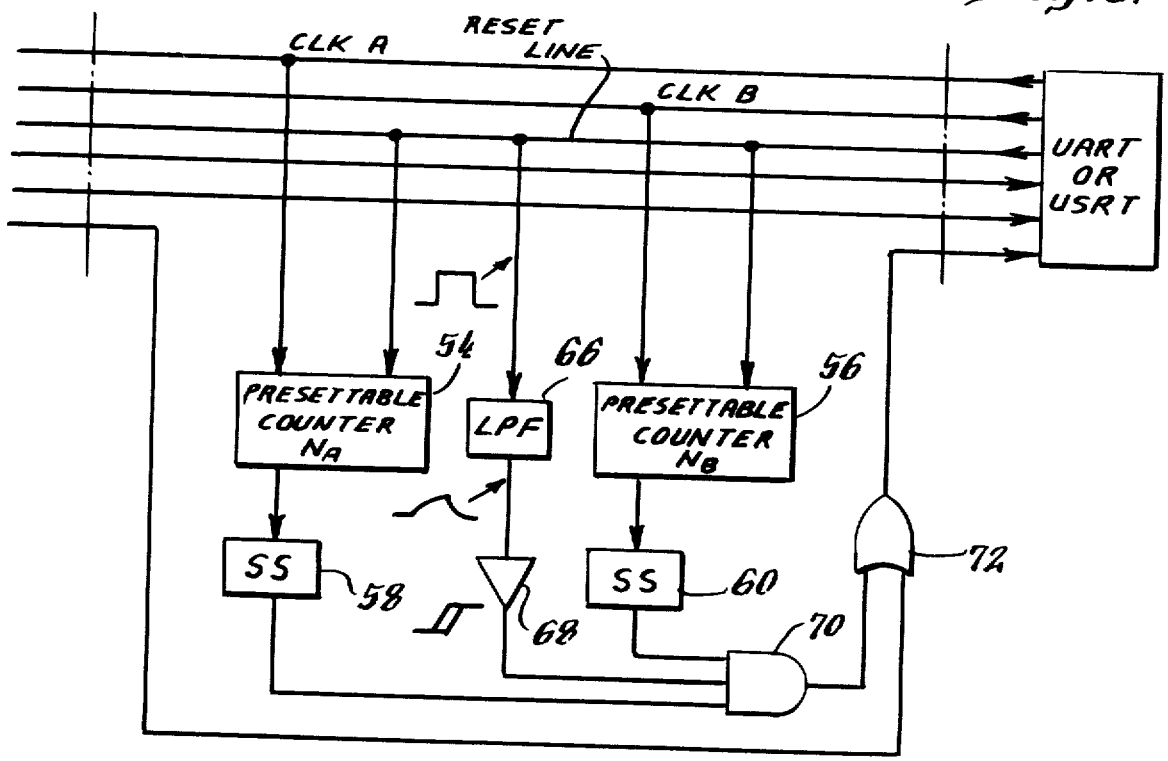
FIG. 6 is a block diagram illustrating the use of a low pass filter with the two presettable counters illustrated in FIG. 5 to place an additional requirement on the system.

FIG. 6 illustrates another embodiment which is similar to the embodiment of FIG. 5, but in addition includes a low pass filter 66 off the reset line. The output of the filter 66 is shaped by a Schmitt trigger 68 and then fed to one of three inputs of an AND gate 70 along with the outputs of the two one shot circuits 58 and 60. The purpose of this addition is to place a requirement on the reset line in order for a true output at the AND gate 70. The condition requires that the reset must immediately follow the final counts of both counters 54 and 56. If the reset is too soon, the counters will be reset, and if the duration is too short there will be an insufficient signal at the input of the Schmitt trigger 66 and no output will be present.

The method and system illustrated illustrating an active coded hardware plug-in device which must be present before an encoded software program can be utilized in a computer whose software is desired to be protected has been described with a level of sophistication many orders of magnitude greater than other protection devices which have been available in the past without their drawbacks and which are limited only by the ingenuity of the software engineer. Unlike many other less sophisticated software protective schemes, the particular method and apparatus of this security device remains transparent such that legitimate back-up copies may be made, the program transferred to a hard disk and other operations are capable of being performed normally without any additional effort on the part of the user. The present system even if the functions of the security device were to be able to be determined, namely its code and circuitry which are sealed in epoxy, it would be necessary to construct a duplicate in order to run a second copy of the software. Because the system employs an active device containing logical elements e.g. transistor circuits, the degree of difficulty in duplicating the active device and its function without the benefit of circuit diagrams may well cost the copier more in time and energy than the value of the software thus inhibiting such attempts. The security system of the present invention can be made available in customized configurations with individual codes assigned to each protected software product and can be included in a package with the software product. The security device may interface with a communications port either as a stand alone item or in a two connector version to permit daisy-chaining thereby allowing two, three or even an entire family of software each having its own individual code to operate simultaneously. Such daisy-chaining arrangements in accordance with the present system would allow peripherals to remain connected to the same port. This has a particular advantage because other types of security systems, for example PROM related devices, would require a separate microprocessor just to keep individual PROM's or software programs identified.

It should be noted that, in most cases, a communications port as previously described does not provide power sources to operate peripheral equipment connected to it. Thus power is provided to the circuitry of the security device by rectifying and storing the energy derived from the varying signals from the UART or USRT at the port.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

What is claimed is:

1. An active coded hardware security apparatus for protecting software which is adapted to be connected by an interface connector to a communications port of a computer, said computer being directed by a coded software program which is interfaced with said hardware through said communications port, said hardware apparatus comprising:
   a presettable (programmable) counter to provide a preset numerical code output which is outputted when interrogated in proper sequence,
   an interface connector connected to said counter which is adapted to be plugged into a communications port of a computer whose software is to be protected,
   a clock input, a reset input and an output line connected between said presettable counter and said interface connector,
   said counter being active and transmitting said preset output over said output line,
   whereby said counter is interrogated by said computer under control of said coded software to determine whether said hardware apparatus is installed and generating the proper response to enable the coded software program to continue.

2. The active coded hardware security apparatus as set forth in claim 1 having at least one additional hardward security device coupled to said communications port, an OR circuit having an output coupled to said communications port, means for coupling the output line of said counter and said additional hardware security device to said OR circuit whereby said additional security device and said counter operate simultaneously through the same communications port.

3. The active coded hardware security apparatus as set forth in claim 2 in which said additional security device has its own presettable code.

4. An active coded hardware security apparatus which is adapted to be connected by an interface connector to a communications port of a computer, said computer being directed by a coded software program which is interfaced with said hardware through said communication port, said hardware apparatus comprising:
- a presettable counter to provide a preset mumerical code output which is outputted when interrogated in proper sequence,
- an interface connector connected to said counter which is adapted to be plugged into a communications port of a computer whose software is to be protected,
- a clock input, a reset input and an output line connected between said presettable counter and said interface connector,
- said counter being active and transmitting said preset output over said output line,
- whereby said counter is interrogated by said computer under control of said coded software to determine whether said hardware apparatus is installed and generating the proper response to enable the coded software program to continue,
- at least one additional hardware security device coupled to said communications port, an OR circuit having an output coupled to said communications port, means for coupling the output line of said counter and said additional hardware security device to said OR circuit whereby said additional security device and said counter operate simultaneously through the same communications port,
- a second clock input coupled to said counter, a one shot circuit coupled to said output of said counter, for generating an output signal of time duration t,
- an AND gate, means for coupling said reset line and said output signal from said one shot circuit to said AND gate, means for coupling the output of said AND gate to said OR circuit, whereby an output will occur only if a reset signal occurs immediately after N clock transitions within the time period "t".

5. The active coded hardware security apparatus of claim 4 in which clock and said second clock inputs are applied through an OR circuit to said presettable counter.

6. An active coded hardware security apparatus which is adapted to be connected by an interface connector to a communications port of a computer, said computer being directed by a coded software program which is interfaced with said hardware through said communications port, said hardware apparatus comprising:
- a presettable counter to provide a preset numerical code output which is outputted when interrogated in proper sequence,
- an interface connector connected to said counter which is adapted to be plugged into a communications port of a computer whose software is to be protected,
- a clock input, a reset input and an output line connected between said presettable counter and said interface connector,
- said counter being active and transmitting said preset output over said output line,
- whereby said counter is interrogated by said computer under control of said coded software to determine whether said hardware apparatus is installed and generating the proper response to enable the coded software program to continue,
- a second presettable counter and a second clock input connected to said second presettable counter, first and second one shot circuits coupled to said counter and said second counter,
- an AND gat coupled to said counter and said second counter whereby a signal is generated by said apparatus when the outputs of said one shot circuits are high and coincident.

7. The active coded hardware security apparatus set forth in claim 6 having a low pass filter and a Schmitt trigger coupled between said reset line and said AND gate whereby a true output is produced from said AND gate only when a reset signal immediately follows the final count signal of both counters.

8. The method of protecting computer software using an active coded hardware security device in conjunction with a small section of code in the computer program comprising the steps of:
- permanently establishing a preset numerical code on an active presettable counter security circuit which is transmitted when interrogated,
- connecting said active presettable counter circuit into a communication port of a computer for receiving clock and reset signals from said computer,
- executing the computer program in said computer,
- interrogating said communications port periodically by said small section of code in said computer program to determine if said active presettable counter circuit is present, which if present and the correct numerical code returned at the time of interrogation, the program is permitted to continue.

9. The method of protecting computer software set forth in claim 8 including the steps of,
- coupling additional security devices in the same communications port and,
- ORing the outputs of each security device.

10. The method of protecting computer software set forth in claim 8 including the step of,
- generating a time related signal and comparing that time generated signal with a reset signal to make any output dependent on the precise occurence of said time related signal.

11. The method of protecting computer software using an active coded hardware security device in conjunction with a small section of code in the computer program comprising the steps of:
- permanently establishing a preset numerical code on an active presettable counter security circuit which is transmitted when interrogated,
- connecting said active presettable counter circuit into a communication port of a computer for receiving clock and reset signals from said computer,
- executing the computer program in said computer,
- interrogating said communications port periodically by said small section of code in said computer program to determine if said active presettable counter circuit is present, which if present and the correct code returned at the time of interrogation, the program is permitted to continue, using a second counter security circuit and controlling each security circuit separately, comparing the outputs of each counter security circuit and, recognizing a true signal when each of said outputs are the same polarity and coincident.

* * * * *